(12) United States Patent
Brown et al.

(10) Patent No.: US 7,918,087 B1
(45) Date of Patent: Apr. 5, 2011

(54) SYSTEM FOR RELOCATING AND CONVERTING POTENTIAL ENERGY OF WATER WITHOUT DAMS

(76) Inventors: Lawrence G. Brown, Nassau (BS); Gregory A. M. Brown, Alamo, CA (US); Brian A. Brown, Alamo, CA (US)

( * ) Notice: Subject to any disclaimer, the term of this patent is extended or adjusted under 35 U.S.C. 154(b) by 160 days.

(21) Appl. No.: 12/427,899

(22) Filed: Apr. 22, 2009

Related U.S. Application Data (60) Provisional application No. 61/147,708, filed on Jan. 27, 2009.

(51) Int. Cl.
*F16D 31/02* (2006.01)

(52) U.S. Cl. ............................................. 60/398

(58) Field of Classification Search ............. 60/398, 60/639; 74/DIG. 9; 415/6
See application file for complete search history.

(56) References Cited

U.S. PATENT DOCUMENTS

| | | | |
|---|---|---|---|
| 28,204 A | | 5/1860 | Shepard |
| 124,843 A | * | 3/1872 | Millard ........................ 60/639 |
| 204,292 A | * | 5/1878 | Clay ............................. 60/639 |
| 379,753 A | * | 3/1888 | Allin ............................ 60/639 |
| 716,483 A | | 12/1902 | Ryan |
| 962,355 A | | 6/1910 | Johnson |
| 1,689,947 A | | 10/1928 | Johnson |
| 3,983,704 A | * | 10/1976 | McFarland ................... 60/639 |
| 4,112,686 A | * | 9/1978 | Trotta .......................... 60/639 |
| 4,151,719 A | * | 5/1979 | Boots ........................... 60/639 |

* cited by examiner

Primary Examiner — Michael Leslie (57) ABSTRACT

A water energy conversion system for convening the potential energy of water to electrical or mechanical energy, takes water at an inlet (105) from a higher elevation source, through a conduit (110) to a lower location. Then a riser (120) conveys the water up to nearly the same elevation it had at the inlet. The riser acts as a "virtual dam", delivering the water with nearly the same head as a dam. The water from the riser is delivered to an energy converter (100) which comprises a loop raceway (130) which constrains and guides a plurality of carriage and disc assemblies (135) connected in a continuous train by links (155). An inlet (125) at the top of the energy converter receives the water where it falls downward through a jacket (140) that is constrained by the raceway (140).

20 Claims, 6 Drawing Sheets

Fig. 11

SYSTEM FOR RELOCATING AND CONVERTING POTENTIAL ENERGY OF WATER WITHOUT DAMS

CROSS-REFERENCE TO RELATED APPLICATION

This patent issued from an application that claims priority of Provisional Patent Application Ser. No. 61/147,708, Filed Jan. 27, 2009.

BACKGROUND

Prior-Art Potential Energy Relocation and Conversion

Hydropower, such as provided by dams, has long been used to generate useable power. However in recent years some more advanced nations have been materially changing their attitude regarding the use of traditional hydropower to generate power for electricity and other power utilization areas, such as pumps. While massive hydropower projects are being planned or developed in other parts of the world, in the United States and Western Europe the era of building dams for power generation appears to be ending, since these large scale hydropower projects have a growing negative environmental impact. E.g., the dams inundate large areas suitable for other uses and block salmon runs. In addition, use of clean water for general uses has been growing, thereby depleting upper level water storage available for hydropower plants. As the negative effects of dams are becoming more evident, societal forces are looking for power sources that create less environmental impact.

Within dam systems, large pipes, called penstocks, have also been used to deliver water from the top of the dam to electric power generators at the bottom of the dam. These generators consist of turbines that convert the kinetic energy of the high-pressure water to rotational mechanical energy and electric generators that in turn convert this rotational mechanical energy to electrical energy. Penstocks are also used outside of the dam system: such pipe systems, sometimes very long and large, bring water form high elevation sources down to "power houses" at lower elevations, and terminate their high pressure delivery to the turbines and electricity generator combinations which are housed within the power houses.

When dams are employed to store potential energy, the body of water behind the dam is fed down the penstock to the turbine where the energy available is determined by the head or vertical distance between the top of the water behind the dam and the point at which it enters the turbine. The potential energy of the water at the top of the penstock is converted to linear kinetic energy as the water flows down the penstock into the turbine. This kinetic energy is then converted to rotational kinetic energy in the turbines, which is coupled to electric generators which convert this rotational energy into electricity, or to pumps for irrigation, or other power utilization devices.

Another long-used form of hydropower employs water wheels to convert the potential energy of water into a useful form of kinetic energy. To utilize water's potential energy, such a wheel or similar device must first have water available to it at a higher level which the wheel can use to convert the water's potential energy to mechanical energy and then discharge the water at a lower level. In this arrangement, flowing water fills a series of buckets on one side of the water wheel, causing the wheel to rotate. The potential energy difference of the water between the entry of water into the wheel and the point at which the buckets release the water near the bottom of the wheel is transformed into rotational kinetic mechanical energy at the wheel's shaft. This energy is available to a generator, pump, or any other power-utilization device that is coupled to the shaft.

One device for converting the energy contained in flowing water to rotational energy is the well-known Pelton turbine in which a series of buckets are rigidly attached to the perimeter of a wheel that is fastened to a shaft. The shaft extends through bearings so that an external load can be attached to it. Water from a high-pressure source, such as the body of water behind a dam, is fed through a nozzle that is aimed at the buckets on the wheel. Thus the Pelton turbine converts the kinetic energy of a stream of water into rotational energy that can be used in a load on the shaft.

There are many variations and adaptations to these prior-art devices. Although they can convert the potential or kinetic energy of water to rotational kinetic mechanical energy, they have various requirements that restrict their use to particular situations. For example, the entire weight of a water wheel is borne by its power output shaft, necessitating bearings and a structure that are properly sized to bear this weight. The water head, i.e., the height of the body of water that causes the water wheel to turn, is limited by the diameter of the wheel. In order to extract the maximum energy from a water wheel, its diameter must be as large as possible, thus necessitating a large footprint. In addition, the efficiency of a water wheel, i.e., the amount of available energy extracted from the water, is limited by the spacing between buckets. The buckets spill some of the water introduced into them, thereby reducing the efficiency of the water wheel.

Dams generally require construction of a dam with a penstock that terminates in a turbine. The dam must be strategically located in order to safely interrupt the flow of water from a source such as a river or stream. In many cases, the placement of a dam results in the adverse ecological consequences noted. In addition, the rate of water flow through the penstock is sufficiently high to cause losses in efficiency due to turbulence and cavitation.

The Pelton wheel requires a high-pressure, high-flow rate water source. Turbulence and cavitation impact the efficiency of a Pelton turbine, which is still regarded as more efficient than the intermediate head height Francis turbines, or the generally used for lower heights (less that 305 meters or 1000 ft) Kaplan turbines.

ADVANTAGES

We have discovered a method and system that overcomes, in one or more aspects, some of the limitations of the prior-art water energy extraction schemes, and enables harvesting of energy from water in locations not now considered usable for such new energy production. This system, in one or more aspects, reduces one or more of the above disadvantages. Various additional advantages will become apparent from a consideration of the ensuing description and accompanying drawings.

SUMMARY

Our system uses water found in nature from any source where a difference in elevation, even relatively small, is available. In one embodiment water from a flowing source is tapped and returned to its original flow. This embodiment uses conduit(s) open on both ends to take water from the higher elevation to a chosen convenient location at a lower elevation where the water returns through a riser pipe to nearly the same elevation as it had at its origin at the higher elevation, thereby nearly restoring its original potential energy state at the new location. This creates a "virtual dam" without building a traditional dam, and allows the virtual dam to be placed in areas where traditional dams could not be constructed. The head of water so created has the same potential energy as the water behind the wall of a traditional dam of the same height would have, if constructed at the same spot where the riser is placed. From that level, the water can be delivered for any use, one of which being a delivery to a highly efficient, gravity powered, energy exchanger the output of which can be rotational kinetic energy. After energy extraction the water can, if desired, be returned to its original flow, or directed otherwise.

REFERENCE NUMERALS

| | | | |
|---|---|---|---|
| 100 | Energy Converter | 105 | Water Inlet |
| 110 | Conduit | 115 | Manifold |
| 120 | Riser | 125 | Inlet Funnel Assembly |
| 130 | Raceway | 135 | Disk and Carriage Assembly |
| 140 | Tubular Jacket | 145 | Chain |
| 150 | Output Sprocket | 151 | Idler Shaft |
| 152 | Output Shaft | 155 | Coupling |
| 160 | Outlet | 170 | Bridge |
| 200 | Disc | 205 | Attachment Point |
| 210 | Attachment Point | 215 | Support Structure |
| 220 | Arm | 225 | Roller |
| 230 | Shaft | 400 | Structural Support & Rail |
| 405 | Bearing Surface of Integrated Rail | 410 | Structural Tab |
| 415 | Seal | 600 | Generator |
| 605 | Conductors | 800 | Ratchet Assembly |
| 805 | Sprocket | 810 | Ratchet Teeth |
| 815 | Spring | 820 | Ratchet Arm |
| 900 | Bank | | |

FIRST EMBODIMENT

Figures 1, 1A:
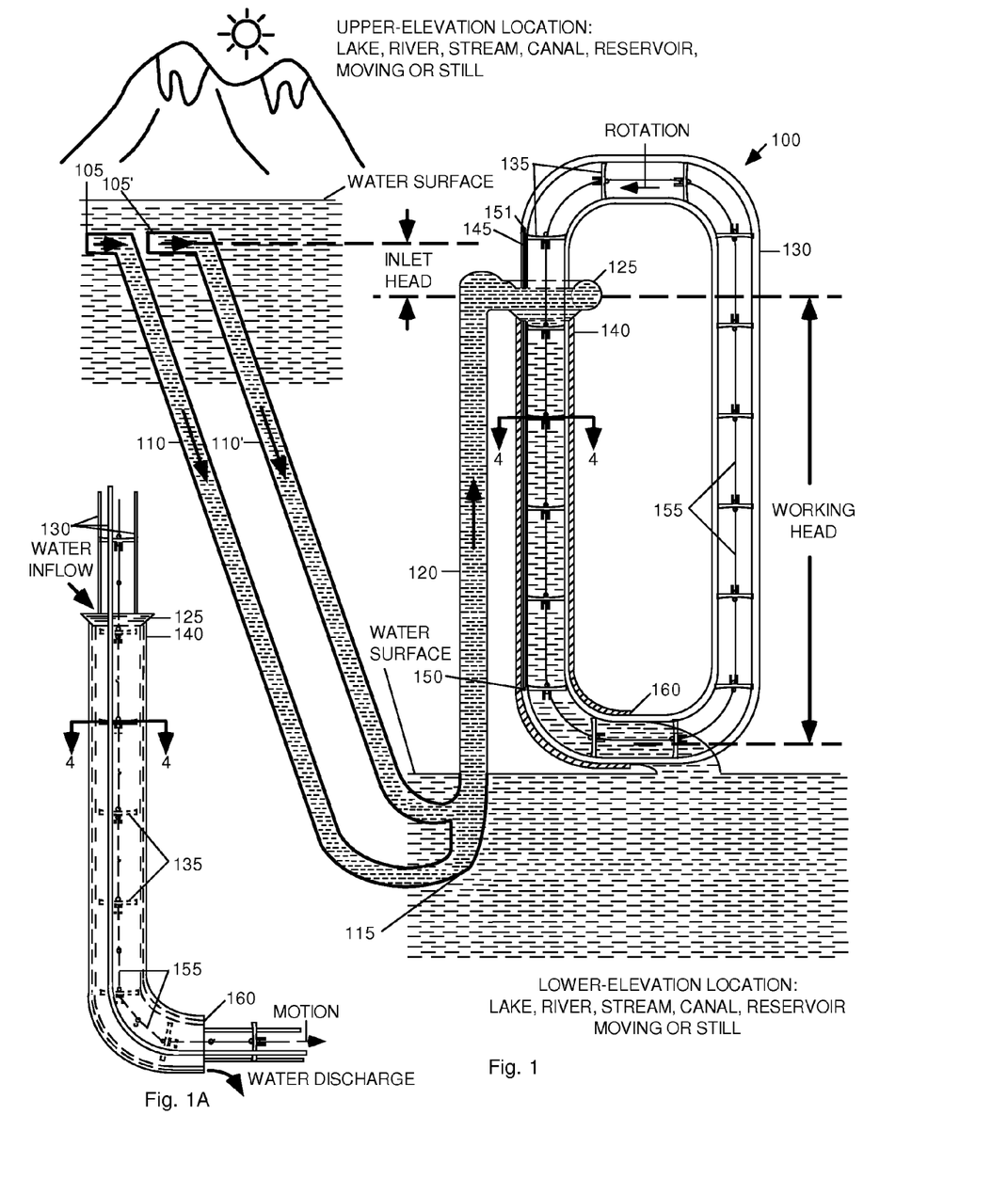
FIG. 1 shows an elevation sectional view of a first embodiment of a energy water conversion system.
FIG. 1A shows a detail view of a portion of FIG. 1.

Description—FIG. 1—system

FIG. 1 shows an elevation sectional view of one embodiment. Two locations, in this case by choice on the same body of water, such as a river, are depicted in FIG. 1, an upstream upper-elevation location and a downstream, lower-elevation location. One or more water inlets 105 and 105' are placed in the water at the upstream location. The upper-elevation location can also be a lake, reservoir, pond, stream, canal, aqueduct, and the like. The water in the upper location can be moving or still. Inlets 105 can be covered with screens or other filters (not shown) to prevent flotsam, fish or other material in the stream from entering the inlets.

One or more relocation conduits 110 and 110' convey water from water inlets 105 down to a common pipe or manifold 115 at a new location and thence to a riser pipe or conduit 120. Riser 120 brings the water level back up to nearly the original elevation it had at inlet 105. From this restored height at the new location, the water can be directed to any desired use, such as irrigation, general use, etc, or it can be conveyed into the upper part of a water wheel, engine, energy exchanger, or energy converter 100. Manifold 115 has a large radius to take advantage of the kinetic energy of the water in the conduits. Riser 120 permits the water in it to rise to nearly the same height it had at inlets 105, thereby regaining approximately the same level of potential energy it had at inlets 105. The water at its restored level can then be delivered from the top of riser 120 to an inlet funnel 125 at the upper part of energy converter 100.

Water from funnel 125 flows by gravity into a tubular jacket 140 of energy converter 100. Jacket 140 is shown as vertical, but can, particularly in larger head situations, be placed on an angle different from vertical. Jacket 140, which confines the water falling through energy converter 100 until its exit at the jacket's termination at outlet 160, is supported by structural supports (not shown) and rails 400. While three such supports and rails 400 are shown, any other convenient number can be used. Also, the supports can be reversed, with all rails placed on a single central support. Assemblies 135 can have an annular shape and jacket 140 can be supported independently. Any similar combinations can be used, as long as disks 200 are able to smoothly move downward in response to the falling water in jacket 400. The rails on supports 400 merely guide rollers 225, with the only load bearing contact being the force transferred from disks 200. This force is transmitted through a ratchet assembly 800 to an output shaft 152 which drives a driving chain 145. Chain 145 can be a single loop extending the height of energy converter 100, or several successive loops. Also, more than one assembly 800 can be placed on assembly 135, providing more than one driving chain and/or output shaft.

Disks 200 and their support structures constitute assemblies 135. Such assemblies are interconnected—in a roller-coaster-track fashion—via couplings 155, and are driven downward inside jacket 140 to exit point 160 by gravity acting on the falling mass of water flowing through jacket 140. The structural supports and rail tracks 400 constitute a continuous loop so that after the discharge of water at point 160, assemblies 135 move up and around to renter jacket 140 through inlet funnel 125. Other ways of returning disks 200 to the top of energy converter 100 without the continuous loop as shown will of course occur to those skilled in the art.

The movement of the discs is arranged to rotate an output shaft, discussed infra, which drives a generator or the like to provide electrical or mechanical output power.

Riser 120 need not always be vertical or have a constant diameter; it may be sloped or may be reduced in diameter at one or more points to accelerate the water in transit. Fewer or more conduits 110 can be used, as required to supply sufficient water to energy converter 100. Inlets 105 are higher than funnel 125 to permit water that flows down to manifold 115 to flow up through riser 120 to funnel 125.

The difference in elevation of the upper and lower-elevation locations is approximately equal to or greater than the desired working head height for this embodiment. The difference in elevations permits placement of the energy converter at or above ground level, resulting in a saving of construction costs. No dam is required to extract the nearly full potential energy available from the water—only a closed conduit of any shape. The water is tapped from an upstream location such as a lake, open ditch, canal, stream, or other water source at an elevation above funnel 125 in order to provide the desired inlet head to energy converter 100.

In the case of the arrangement shown in FIG. 1, inlet 105 at the upper elevation location will be at an elevation approximately equal to the height of energy converter 100 above the water surface at the lower elevation location. Energy converter 100 can vary in height from 30 cm to 15 meters or more. Where placement of a single energy converter 100 is found to be insufficient, two or more such converters can be placed in tandem. E.g., a portion or all of a tall waterfall can be guided down through a series of converters 100, one after another, just as large flows can be also guided into lines of converters 100 in parallel. In one embodiment, the width of converter 100 is one-third its height and its depth, i.e., the diameter of raceway 130, is one-twelfth its height, although other ratios are possible. The lumen of inlet 105 and conduit 110 ranges from 20 cm for a small embodiment of converter 100 to two meters or more for a large version. The area of the lumen of riser 120 is approximately equal to the sum of the lumen areas of conduits 110. The diameter of the upper portion of funnel 125 is approximately equal to twice the diameter of raceway 130 and the diameter of the lower portion of funnel 125 is approximately equal to the inner diameter of raceway 130. There are no specific size requirements or limitations to this concept, except as space and or designer's engineering knowledge impose.

Manifold 115 is positioned at an elevation below converter 100. Conduits 110 can be laid in a stream bed, thereby simplifying their installation. In another aspect, conduits 110 can be routed differently, i.e., over land or via tunnels, from inlets 105 to inlet funnel 125. In either case, the inlet head is preserved. Further, conduits 110 can be deployed along the banks of waterways for erosion control, bank protection and can be integrated into the design of the banks for canals, aqueducts or similar waterways.

Inlet funnel 125 of converter 100 feeds water into tubular jacket 140 within raceway 130. Raceway 130 contains a train of energy-receiving assemblies 135, each of which comprises a disc, blade, or vane with a guiding and holding carriage, hereafter disc assemblies 135.

Figure 4:
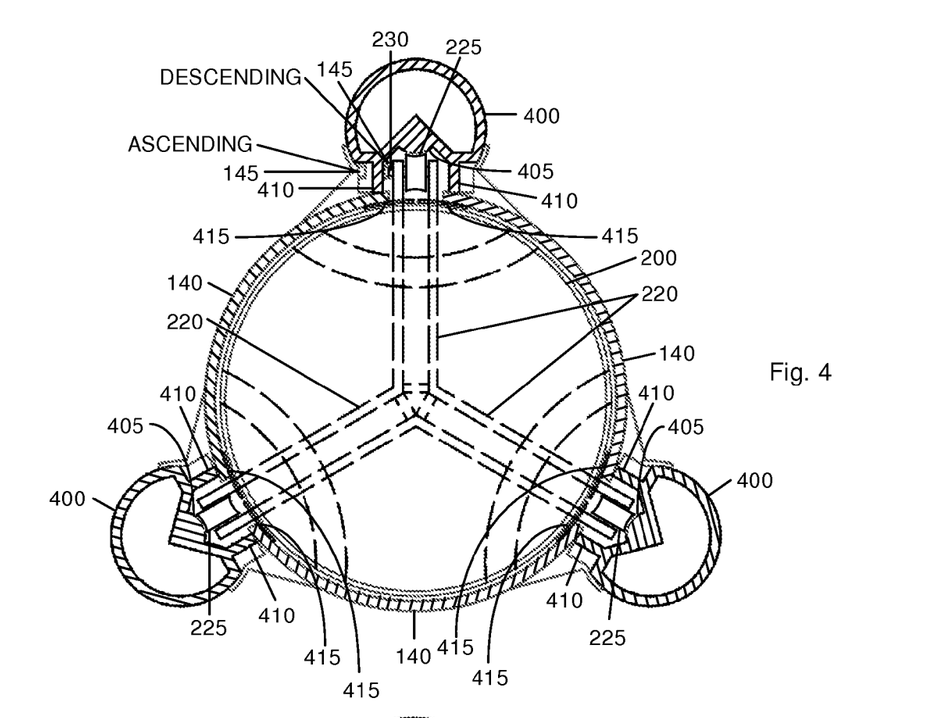
FIG. 4 shows a top view of the assembly of FIG. 2 in place between three structural elements with integrated rails.

As best shown in the detail view of FIG. 1A and also in FIGS. 1 and 4, jacket 140 comprises three individual longitudinal sections separated by slots. The sections surround raceway 130 in the region starting at the bottom of funnel 125 and extending downward to the bottom of energy converter 100. At the bottom, jacket 140 curves in a horizontal direction. This permits the remaining energy from the water, now only kinetic, to still impart force onto disc assemblies 135 before leaving outlet 160.

FIG. 4 is a cross-sectional view, discussed in more detail below, of raceway 130 and jacket 140. The raceway is an open structure comprising three hollow rails 400 in a triangular arrangement that hold and surround jacket 140 on the left side of the raceway, i.e., the portion of the raceway between funnel 125 and the bottom of converter 100 that extends to outlet 160.

Jacket 140 (FIGS. 1 and 1A) starts at the bottom of funnel 125 near the top of converter 100 and ends at outlet 160 at the bottom of converter 100. Thus water enters jacket 140 via funnel 125 and exists the jacket at outlet 160. Rails 400 (FIG. 4), which constitute raceway 130, enclose jacket 140 on the left side of converter 100. Jacket 140 (FIG. 1) constrains the water it receives from funnel 125 to the region between successive energy-receiving assemblies 135 on the left side. Thus the weight of the water in this region urges assemblies 135 downward. Since the water leaves converter 100 at outlet 160, there is no water weight to be lifted on the right-hand side of converter 100. Thus, the weight of the water within jacket 140 urges the train of assemblies 135 to rotate counterclockwise (CCW).

As will be explained, disc assemblies 135 (FIG. 4) each have a carriage comprising three roller arms which ride on rails 400 to guide the discs around raceway 130 on these rails. Jacket 400 encloses the discs but has three longitudinal slots to allow the arms to extend through the slots to connect with the rails in the region of the jacket.

Converter 100 also includes a power output coupling chain 145 having an output shaft 152 (FIGS. 6A and 6B) and an idler shaft 151. Disk assemblies 135 are joined by a series of inextensible couplings 155, such as chain, cable, or wire links that maintain a fixed spacing between adjacent assemblies 135. Disk assemblies 135 are constrained to move around raceway 130 on rails 400, as described below. The water is supplied by funnel 125 to the upper part of the left side of energy converter 100, thereby forcing assemblies 135 on the left side to move downward in a CCW direction as viewed in FIG. 1.

Water from riser 120, which enters converter 100 at inlet funnel 125 at nearly the same level of potential energy it had at inlets 105, is constrained to flow downward within jacket 140 by the force of gravity, and leaves jacket 140 and energy converter 100 at outlet 160. From there it returns to the stream from which it was tapped at inlets 105. Also, and especially if the water was not tapped from a stream, it can be routed to any other lower location, such as a stream, lake, ocean, etc. Outlet 160 is merely the truncated end of jacket 140. When assemblies 135 reach outlet 160, the water that was contained in the volume between two adjacent assemblies 135 is no longer constrained within jacket 140 and it is released to fall downward into the original body of water at the lower elevation, or to any other receiving channel or sink.

Figure 2:
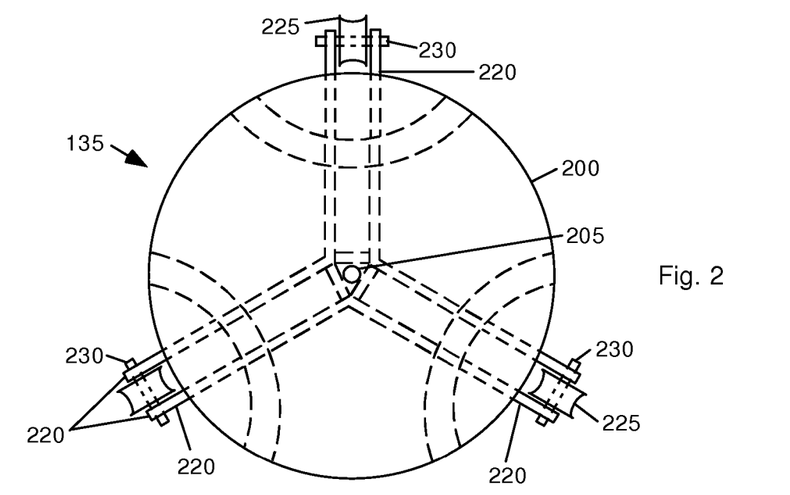
FIG. 2 shows a disc and carriage assembly used in the embodiments of FIG. 1.

FIG. 2

Disk Assembly

Figure 3:
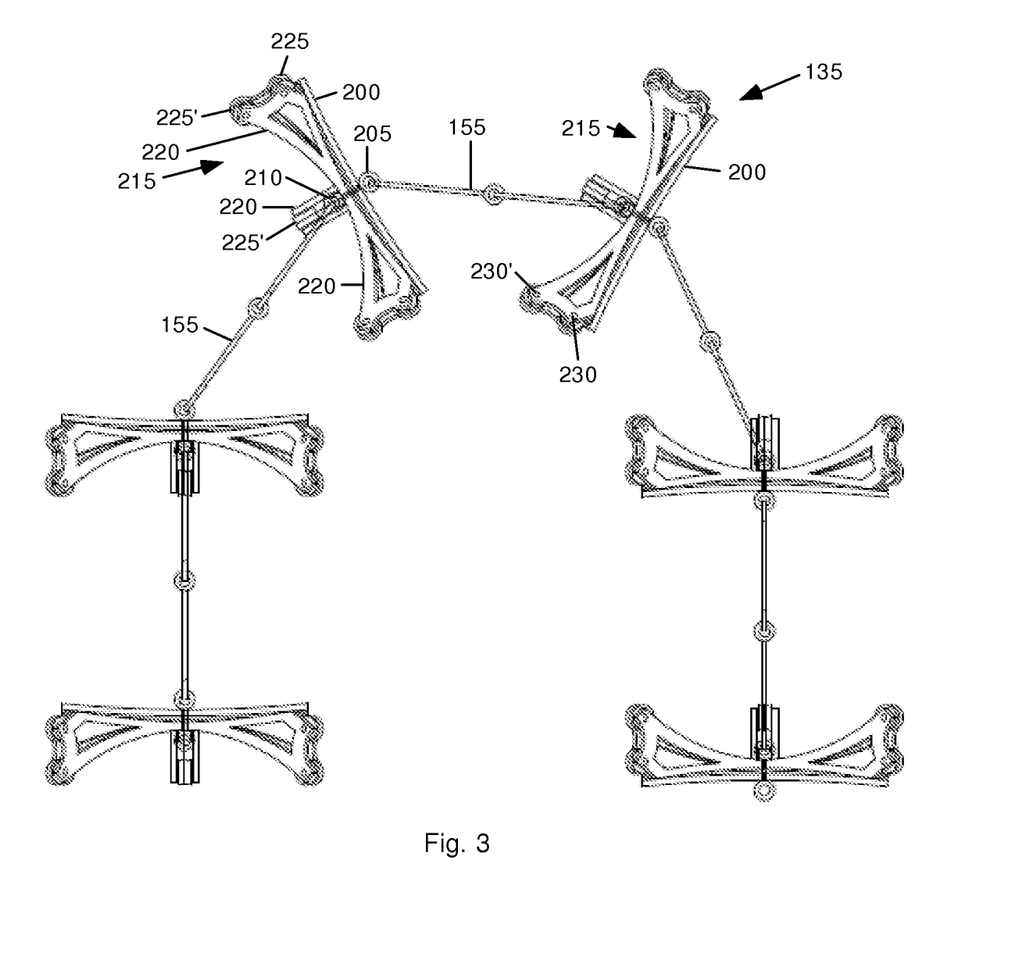
FIG. 3 shows a plurality of assemblies of the assembly of FIG. 2 joined by couplings.

FIG. 2 shows a top view of one of disk assemblies 135. Each assembly 135 comprises a disc 200 having a surface that is either flat or slightly concave, upper and lower attachment points 205 and 210 (FIG. 3), and a support structure 215. A carriage comprises three pairs of arms 220 that extend from structure 215 at 120 degree intervals. Each pair of arms 220 supports two rollers 225 and 225' (FIG. 3) on shafts 230 and 230' (FIG. 3). At the end of at least one set of arms 220 additional mounting elements are included as needed to support a ratchet assembly 800, as described below. Two rollers 225 on each arm 220 ensure that disc 200 will remain perpendicular to the axis of raceway 130 at all times. Arms 220 extend through three respective slots in jacket 140 and support wheels 225 and 225'. Wheels 225 and 225' ride on and are guided by rails 400 (FIG. 4) of raceway 130.

FIG. 3

Series of Disk Assemblies

FIG. 3 shows a side view of a plurality or series of disk assemblies 135. Assemblies 135 are connected by couplings 155. One end of coupling 155 is secured to attachment point 205 on a first of assembly 135; the other end is secured to attachment point 210 on a second, neighboring assembly 135. A predetermined number of assemblies 135 are connected to form a continuous chain, as shown in FIG. 1. While couplings 155 are shown as a set of hinged or pivotable rods, they could also be one or more cables, or made from other suitable materials.

FIG. 4

Disk Assembly and Rails

FIG. 4 is a cross-sectional view perpendicular to the face of one of discs 200, showing three rails 400 that comprise raceway 130. Disc assemblies 135 ride on and are constrained to travel around these rails. Rails 400 are integrally connected and are structurally supported by a rigid mounting structure (not shown) in a symmetrical arrangement at 120° intervals around discs 200. The rails and their mounting structure enclose and hold jacket 140. Jacket 140 has three longitudinal slots through which arms 220 and wheels 225 extend, respectively. Each rail 400 includes a bearing surface 405 on which rollers 225 and 225' roll, and a pair of structural tabs 410. Each rail 400 has two tabs 410 that extend inward to secure the three sections of jacket 140 to raceway 130 and to constrain arms 220 and wheels 225. Resilient seals 415 are optionally located on each side of the path of travel for each arm 220 to aid in sealing the slots of jacket 140 to minimize water leakage through these slots.

Figure 5:
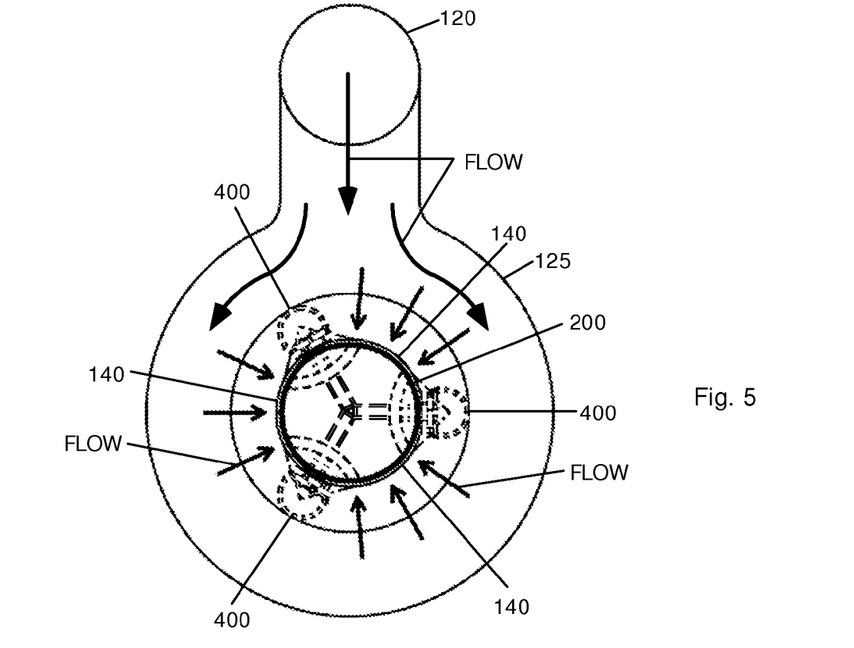
FIG. 5 shows a top view of an inlet assembly for the system of FIG. 1.

FIG. 5

Riser And Inlet Assembly

FIG. 5 is a top view of riser 120 and inlet assembly 125 showing the flow of water from riser 120, around within, and then out of assembly 125. Water flows from assembly 125 downward onto disc 200 and fills raceway 130 as multiple discs 200 move downward within tubular jacket 140.

Figure 6A:
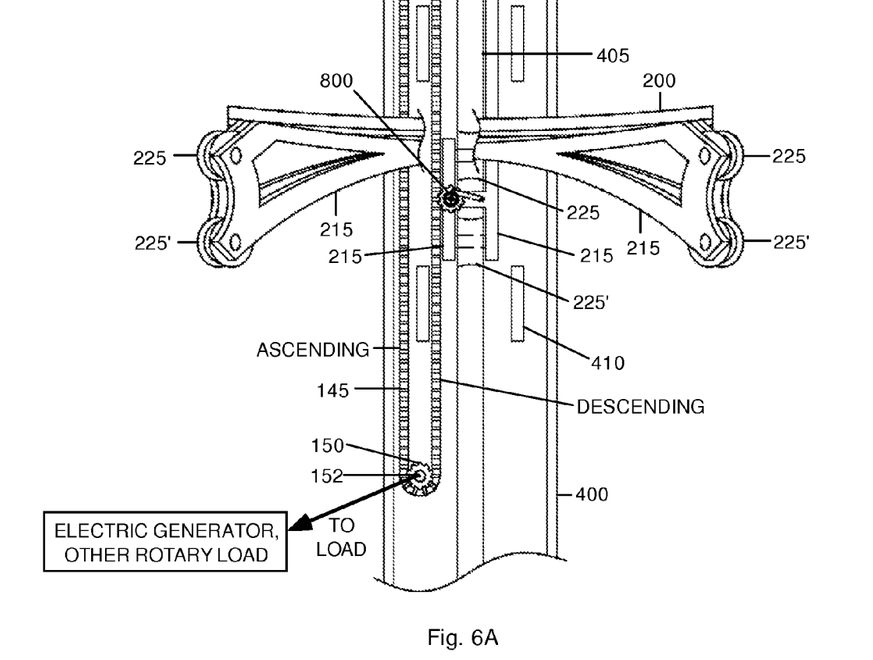
FIG. 6A shows side view of the disc and carriage assembly engaged with a power chain.
Figure 6B:
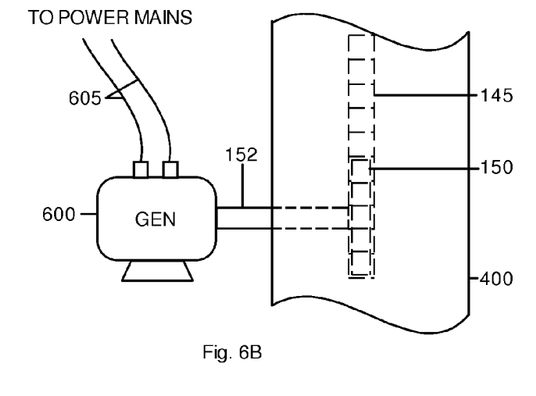
FIG. 6B shows a detail view of the power output shaft connected to an electrical generator.

FIGS. 6A and 6B

Power Output Chain

FIG. 6A is a side view of a power output chain 145 located at one of the structural supports with integrated rails 400. Parts of all three sets of arms 220 have been removed from FIG. 6A for clarity. Wheels 225 and 225' remain in the figure and are shown in contact with bearing surface of integrated rail 405 of structural support and integrated rail 400. Chain 145 is routed from above around idler shaft 151 (FIG. 1A), and from below by power output sprocket 150 and shaft 152.

FIG. 6B shows a detail view of chain 145, sprocket 150 and shaft 152. Shaft 152 is connected to an electrical generator 600 which delivers power to electrical mains through a plurality of output conductors 605. In lieu of an electrical generator, any other power-utilization device, such as a pump or other load, may be substituted.

Figure 7:
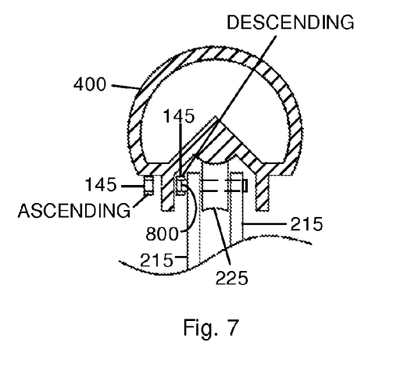
FIG. 7 shows a top view of a carriage assembly and wheel on an integrated rail with the engagement from the disk with a power chain.
Figure 8:
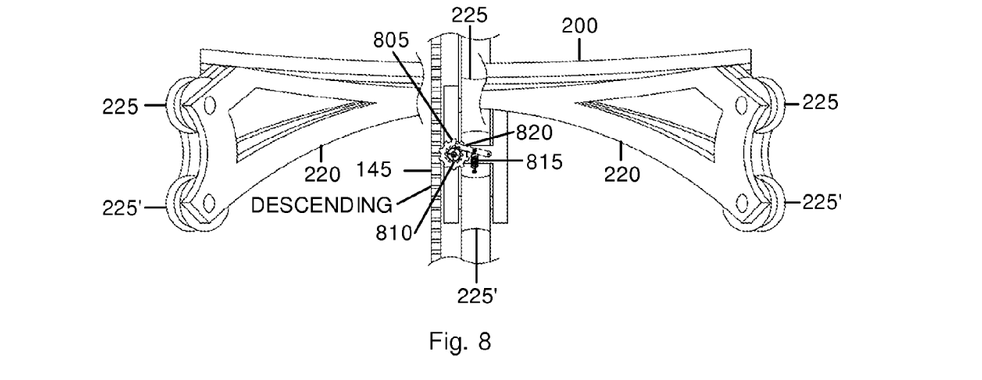
FIG. 8 shows a one-way ratchet assembly from the disk with the power chain.

FIGS. 7 and 8

Ratchet Assembly

FIG. 7 shows a top view of ratchet assembly 800 engaged with a descending link in chain 145. The weight of water on disc 200 (not shown in this figure) attached to arms 215 is applied to the descending side of chain 145 by ratchet assembly 800, thereby causing output shaft 152, connected to sprocket 150, to turn.

FIG. 8 shows a more detailed view of ratchet assembly 800, which is attached to a plurality of supporting structural elements added to arms 220. Assembly 800 comprises a sprocket wheel 805 for engaging chain 145, ratchet teeth 810, and a ratchet arm 820. Ratchet arm 820 is held against teeth 810 by a spring 815. Ratchet assembly 800 is a one-way ratchet that allows each disk and carriage assembly 135 to apply the downward force from the load of the water falling under gravity to be applied to chain 145, resulting in power output to shaft 152, but preventing reverse torque on shaft 152 from reversing the motion of chain 145 and disk and carriage assemblies 135. Ratchet assembly 800 thus allows all the downward force of the falling water to be applied to chain 145 while allowing chain 145 to move past each disk and carriage assembly 135 should the chain 145 be moving faster than the disk and carriage assemblies, thereby eliminating any reduction in speed or energy to the output shaft 152.

Disc and carriage assemblies 135 and structural supports and integrated rails 400 are preferably made of metal, although a strong plastic material can be used. Raceway 130 is preferably made of plastic, although metal can be used. Tubular jacket 140 is preferably made of a plastic material, although metal can be used. Conduits 110, manifold 115, riser 120, and inlet assembly 125 can be made of plastic, metal, concrete, wood or any suitable material.

OPERATION

FIGS. 1, 5, AND 7

As stated, conduits 110 (FIG. 1) with inlets 105 convey water from the body of water at a higher- or upstream location to energy converter 100 at a lower-elevation location, which may be near to or distant from inlets 105. Water from conduits 110 enters manifold 115 and flows upward through riser 120, where at its highest elevation it regains nearly the same level of potential energy it had at inlets 105. Since this arrangement is able to convert the water's potential energy or head to mechanical energy without creating a lake and without the other disadvantages of a dam, we call it a "virtual dam". The virtual dam relocates or moves the water's potential energy head from one location (inlets 105) to another location (converter 100). In addition to bringing the water's potential energy or higher head to an energy converter, this arrangement or virtual dam can be used to bring the higher head to a location where distribution for irrigation is needed, where a fire pump is installed and needs a better reach, or simply where general use delivery is required and where pumps are not desirable or not available.

At the top of riser 120, the water is diverted into inlet funnel 125. The water flows around the periphery of funnel 125 and out the bottom of funnel 125 into jacket 140, as indicated by heavy arrows (FIG. 5). After the water flows out of funnel 125, it flows downward, into the upper end of jacket 140, filling the space between each adjacent pair of disk assemblies 135. The full weight of the water is transmitted to successive discs 200. A close fit between discs 200 and jacket 140 (FIG. 4), together with seals 415, minimizes water leakage. Unlike dam arrangements, where penstocks carry the water down so that its potential energy is converted to kinetic energy to drive the turbine, in our system, the water is brought back to nearly its original level before being fed into the energy converter. Thus its potential energy, rather than kinetic energy, is converted to mechanical energy.

The weight of water on discs 200 causes the connected chain of disks and carriages 135 to move downward on the left side of converter 100 and rotate assemblies 135 CCW around raceway 130. I.e., the water falling into jacket 140 urges all discs 200 in turn and disk and carriages 135 on the left side of converter 100 to move downward until the disks and carriages reach outlet 160, where the water is released. More conduits 110 can be used, as required to supply sufficient water to converter 100.

As the topmost disk and carriage 135 approaches idler shaft 151 (FIG. 1), ratchet assembly 800 (FIGS. 7 and 8) engages an open link space in chain 145. When this particular disk and carriage 135 moves below inlet funnel 125, the weight of water on this disc 200 is communicated to chain 145. This process causes all of assemblies 135 to move within the water column falling within jacket 140. Thus the weight of the entire water volume within jacket 140 is communicated to chain 145 on a continuous basis. Since the column of water in jacket 140 flows continuously, chain 145 rotates continuously, passing between idler sprocket 151 (FIG. 1) and output sprocket 150 and shaft 152. This provides continuous rotational energy at shaft 152. Ratchet assembly 800 prevents otherwise potentially damaging reverse torque on shaft 152 from reversing the direction of assemblies 135 on raceway 130.

The mechanical or rotational energy at shaft 152 can be utilized in various ways. E.g., it may be connected to an electrical generator (FIGS. 6A and 6B) to provide electrical energy for domestic or industrial use or to a pump for pumping water for irrigation at a convenient location or for driving a refrigeration system for air conditioning or food refrigeration.

FIRST ALTERNATIVE EMBODIMENT

Figure 9:
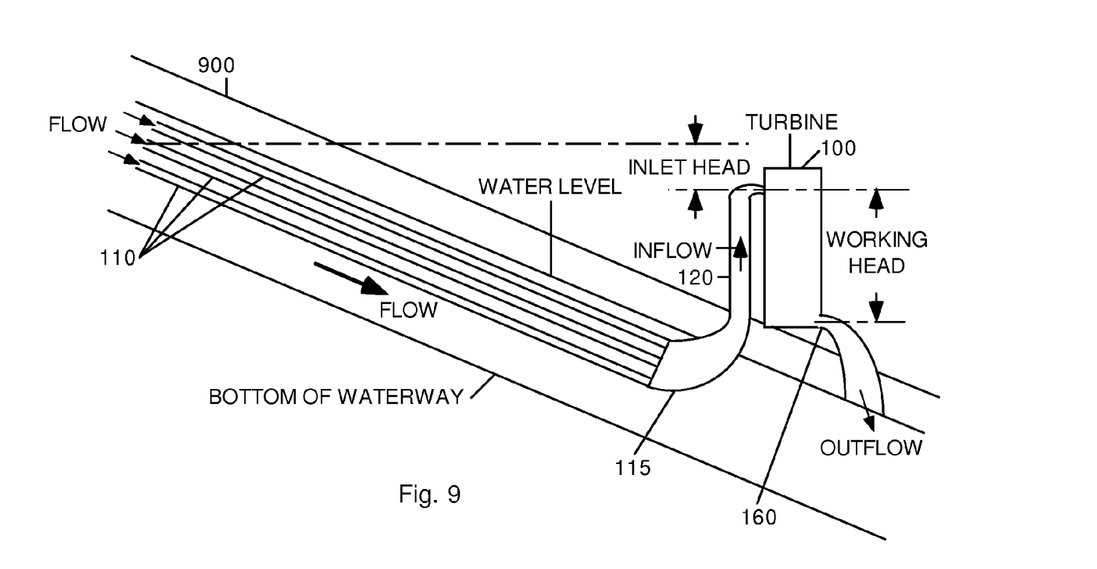
FIG. 9 shows the embodiment of FIG. 1 configured for use in a stream, river, canal, or aqueduct.

Description and Operation—FIG. 9

FIG. 9 shows the embodiment of FIG. 1 configured for use in a stream, canal, aqueduct, or river bounded by a bank 900 on each side. Conduits 110 bring the water from the upper elevation to riser 120 at the lower elevation. The conduits may be routed over any convenient location, including outside of the banks. The upper or inlet ends of the conduits is at an elevation sufficient to provide an input head at the top of riser 120 that causes water to flow at a predetermined rate into an converter 100.

Alternative Installations

Figure 10:
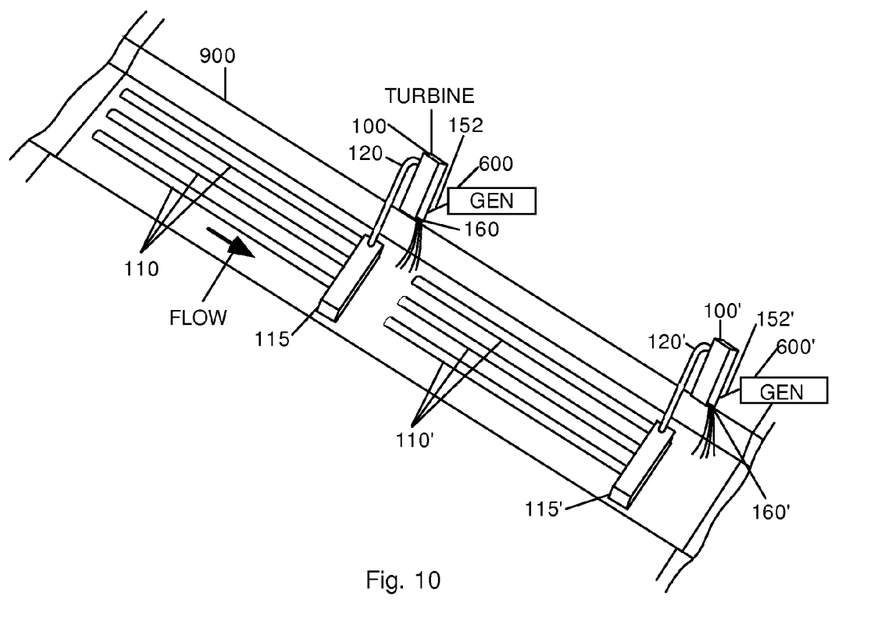
FIG. 10 shows a serial arrangement of two aspects of the first embodiment.
Figure 11:
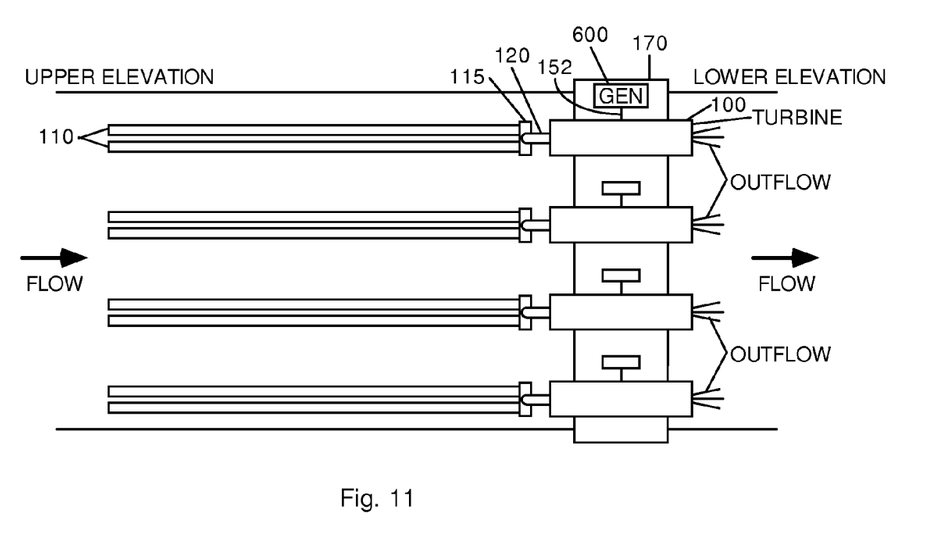
FIG. 11 shows a parallel arrangement comprising a plurality of the aspects in FIG. 1.

Description and Operation—FIGS. 10 and 11

FIG. 10 shows a plurality of the embodiments in FIG. 9 arranged serially. In FIG. 10, a second unit comprising all the components of the embodiment in FIG. 9 is placed in a water way following a first unit. Serial placement of the embodiments of FIG. 9 permits continued and repeated extraction of energy from a waterway with a downhill path that is sufficiently long and on a slope sufficient to accommodate additional energy extraction units. In this way, the maximum energy is captured from the vertical fall of the water.

FIG. 11 shows a plurality of the embodiments of FIG. 9 in a parallel arrangement. Two or more such units are placed side-by-side so that they can each extract energy from the moving water. In a waterway that is sufficiently wide to accommodate additional units like the embodiment of FIG. 9, additional energy can be harvested from water that would otherwise flow unused past a single unit. Although the units are shown aligned side-by-side in FIG. 11, they can also be staggered, if desired. In FIG. 11 energy exchanger 100 is supported by a bridge 170 over the waterway, but its location can be elsewhere. Its location is limited only if the water is to be returned to a downstream location after extraction of its energy.

CONCLUSION, RAMIFICATIONS, AND SCOPE

In one or more aspects, our system has various advantages as follows: It harvests the potential, rather than the kinetic, energy of water and provides virtually the same potential energy for conversion as a dam, if one were to be built at the same location as riser 120. I.e., virtually the entire working head of the water is realized and used as it passes through our system, yet it has few, if any or the dam's disadvantages. It requires no land flooding or configuration or heavy construction required for damming water. Unlike a dam, it can be made at one location and shipped to another for installation. Also it can be deployed on low slope terrain or areas where a dam could not be built. It can be deployed across the width of a waterway and/or in sequence down the entire waterway, repeating the power generating capacity in both the width (across) and/or length (in sequence) down a waterway or down a given elevation drop. It utilizes the ability of water to seek its own level to operate with a constant head of water; this permits optimized design at given water flow rates, and we can utilize nearly any difference in elevation to efficiently harvest energy from water. We believe that, in various aspects, it will exceed the efficiencies of the conventional tribunes now used in the dams and may be able to produce overall nearly twice the electric power from the same quantity of water potential energy.

In the step of conversion from potential to kinetic energy, we believe that in at least several aspects our system has superior features to conventional dams and water wheels. In a water wheel, water fills each bucket which is spaced from the next bucket by at least the height of one bucket. In aspects of our system, the water column is vertical and continuous and is full at all times so that each power disk is loaded with the maximum weight of one section of water in the column. The energy converters now used require enormous head values which are not suitable for the more widely available lower heads that aspects of our system can exploits. Our system can handle any size head by the use of tandem arrangements if required.

While the above description contains many specificities, these should not be considered limiting but merely exemplary. Many variations and ramifications are possible.

For example, more or fewer conduits can be used to deliver water from an upstream source to the system. Where space is available, a number of replicas of our system can be used, either side-by-side, serially, or both. Each replica utilizes only a part or nearly the full amount of the available water at a given location. Thus while a single one of our stations can produce significant amounts of energy for say, generators, the ability of our system to harvest energy—in the megawatt range—without building dams should significantly improve the harvesting of energy from water.

The conduit intakes can be positioned at a fixed elevation near the surface of the water source, or their elevation can be adjusted automatically or manually if the height of the water source changes. In lieu of circular discs 200, the energy-receiving members can be blades or vanes having an elongated shape, or any other shape desired, such as flat or concave (bucket-like) oval, triangular, rectangular, square, etc. Energy exchanger 100 can be replicated to receive energy form several conduits.

While the present system employs some elements which are well known to those skilled in the art, it combines these elements in a novel way which produces a new result not heretofore discovered. Accordingly the scope should be determined, not by the embodiments illustrated, but by the appended claims and their legal equivalents.

The invention claimed is:

1. A method of relocating a water potential energy head, comprising:
   providing a plurality of relocation conduit having a first end at an upper elevation and a second end at a lower elevation, said second end being located at a different location from said first end,
   providing a manifold at said lower elevation for combining the water in said plurality of relocation conduits and feeding said water to said riser conduit, whereby water entering said relocation conduits flows through said manifold, and upward through said riser to re establish nearly its starting level of potential energy,
   providing a riser conduit having a bottom end coupled to and extending generally upward from said manifold to a top end of said riser conduit the level of said first end of said relocation conduit to permit water entering said first end of said relocation conduit to seek its entering level,
   causing water at said first end of said relocation conduit to enter said relocation conduit and flow down to said second end of said relocation conduit flow through said manifold and then up said riser conduit to said top end of said riser conduit,
   thereby to restore much of the potential energy that said water had at said first end of said relocation conduit so as to make said potential energy available at said different location.

2. The method of claim 1, further including providing an energy converter arranged to receive said water from said second end of said riser conduit and convert the potential energy at said second end of said riser conduit to mechanical energy,
   whereby said energy converter can be used to convert the potential energy of said water at said first end of said relocation conduit to mechanical energy at said different location and without a dam.

3. The method of claim 2, further including an electrical generator connected to said energy converter for converting said mechanical energy to electrical energy.

4. The method of claim 2 wherein said energy converter comprises a jacket having an upper inlet and a lower outlet, said inlet connected to said second end of said riser conduit so as to receive water from said second end and discharge said water from said outlet, said jacket containing a series of energy receiving discs, vanes, or blades arranged to be moved around a raceway by water entering said inlet.

5. The method of claim 4 wherein said series of energy receiving discs, vanes, or blades is connected together by a series of members joining adjacent discs, vanes, or blades, and including a chain connected to said discs, vanes or blades and arranged to turn an output shaft in response to movement of said discs, vanes, or blades.

6. The method of claim 5, further including a ratchet assembly connected to said chain and arranged to allow said chain to move faster than said discs, vanes or blades.

7. The method of claim 2 wherein said energy converter comprises a raceway having a plurality of endless tracks or rails and a jacket on a portion of said raceway, said jacket having an upper end arranged to receive said water from said second end of said riser conduit and a lower end arranged to discharge said water, said raceway containing and arranged to guide a series or train of discs around said raceway and through said jacket, such that water entering said upper end of said jacket forces the discs in said jacket down through said jacket.

8. An energy converter for extracting energy from water, comprising:
   a water inlet,
   a tubular jacket arranged to receive water from said water inlet and extending down from said inlet,
   a plurality of moveable energy-receiving discs serially connected by a plurality of links of predetermined length and arranged to be moved by water entering said jacket via said inlet,
   a plurality of carriages attached to said discs and arranged to guide and hold said discs, each carriage including a plurality of arms with wheels, said wheels mounted on shafts secured at the ends of said arms, at least one of said arms further including a ratchet assembly for engaging a chain.
   means for guiding the motion of said discs,
   means for coupling the movement of said discs to a rotatable power output shaft so that said shaft rotates in response to the movement of said discs,
   said jacket containing a water outlet at a lower elevation thereon than said inlet,
   whereby when said water inlet delivers water into said jacket, said water fills said jacket and the space between said discs and urges said discs downward under the weight of said water, thereby causing said power output shaft to rotate, thereby providing rotational energy at said shaft.

9. The energy converter of claim 8 wherein said means for guiding comprises a plurality of rails, one of said rails containing an idler sprocket and a power output sprocket with a shaft, said sprockets further supporting a chain, with links, said chain being arranged to engage said rotatable output shaft in order to urge said chain downward with a force proportional to the weight of water contained in the spaces between said discs.

10. The energy converter of claim 8, further including at least one relocation conduit having a first end at an upper elevation and a second end at a lower elevation, a riser conduit having a bottom end coupled to and extending generally upward from said second end of said relocation conduit to a top end of said riser conduit at a level below said first end of said riser conduit to permit water entering said first end of said relocation conduit to seek its entering level and thereby restore much of the potential energy it had at said first end of said relocation conduit so as to provide an entry head, said top end of said riser conduit connected to said water inlet.

11. The system of claim 10, further including an electrical generator connected to said power output shaft.

12. A method for relocating the potential energy of a head of a body of water at one location to another location, comprising:

providing an inlet to tap water from said body of water at said one location, providing a relocation conduit having an upper end at said inlet and a lower end at said other location, said lower end being at a level lower than said upper end, providing a riser conduit having lower and upper ends, said lower end being coupled to said lower end of said relocation conduit, said upper end being at a higher level than said lower end of said relocation conduit so that said riser can conduct said water from said lower end of said relocation conduit to said upper end of said riser conduit so that the potential energy of said water at said one location is mostly restored at said upper end of said riser conduit, whereby water will flow from said body of water into said inlet, down through said relocation conduit, and up through said riser conduit, so that its potential energy will be substantially restored at upper end of said riser conduit at said other location, providing an energy conversion system at said other location, said energy conversion system including:

a jacket having an upper end with an inlet connected to said upper end of said riser conduit and a lower end with an outlet, a plurality of moveable discs connected by linkages and moveable within said jacket, said discs arranged to receive and be moved downward by water entering said jacket from said upper end of said riser conduit, wherein each of said discs is supported by a carriage, each carriage including at least one shaft supporting a wheel, a chain and an output sprocket, each disc and carriage arranged to engage a link in said chain and urge said link downward, said chain arranged to rotate said output sprocket and shaft, and means for connecting said discs to an output shaft and arranged to couple movement of said discs to rotate said output shaft.

13. The method of claim 12 further including a plurality of rails for guiding and constraining said carriages.

14. The system of claim 12, further including an electrical generator connected to said output shaft.

15. The method of claim 12, further including a plurality of parallel relocation conduits and a manifold at said lower ends of said relocation conduits and arranged to couple water from said relocation conduits to said riser.

16. In combination, relocation conduit means for delivering water from an upper-elevation source at one location to a riser conduit at another location, said riser conduit extending upward and having an upper end at almost below said upper elevation source, an energy-conversion system at said other location, said energy-conversion system having an inlet connected to said upper end of said riser conduit and an outlet at a lower elevation than said upper-elevation source, said energy-conversion system comprising a jacket containing a train of discs and having an upper end arranged to receive water from said inlet so that said discs are moved downward under the weight of said water in said jacket, said jacket having a lower end at said outlet for releasing said water from said jacket at a lower elevation than said inlet, guiding means for guiding said discs continuously through said jacket in an endless arrangement, wherein the guiding means includes:

a raceway having a plurality of endless tracks or rails, said jacket being mounted on a portion of said raceway, said jacket having an upper end constituting said inlet and arranged to receive water from said upper-elevation source and a lower end having said outlet for discharging said water, said raceway containing and arranged to guide said train of discs around said raceway and through said jacket, such that water entering said upper end of said jacket forces the discs in said jacket down through said jacket, means for coupling said discs to a power output shaft when said discs move downward, whereby when water flows from said upper-elevation source downward through said relocation conduit means, up through said riser conduit, into said jacket and out said outlet, energy is extracted from the potential energy or weight of said water at said upper end of said riser conduit.

17. The combination of claim 16, further including a plurality of said conduit means for tapping water from a series of locations in said source, and a manifold means and a riser, said manifold arranged to combine the water from said conduit means to said riser, said riser arranged to convey said water up to said inlet of said energy conversion system.

18. The combination of claim 17 wherein said source is a flowing body of water and said plurality of said conduit means are arranged in parallel in said flowing body of water.

19. The combination of claim 16, further including a series of respective carriages for guiding said train of discs in said jacket, and said guiding means comprises a plurality of rails, one of said rails containing an idler sprocket and a power output sprocket with a shaft, said sprockets further supporting a chain with links, said chain being arranged to engage said rotatable output shaft over the length of said guiding means in order to urge said chain downward with a force proportional to the weight of water contained in the spaces between said discs.

20. The combination of claim 16 wherein said jacket has a plurality of longitudinal slots and wherein each of said discs of said train of discs has a carriage or guiding means for guiding said discs on said tracks or rails, said guiding means extending from each disc to said rails through said slots in said jacket.

* * * * *